United States Patent [19]
Held

[11] Patent Number: 4,699,676

[45] Date of Patent: Oct. 13, 1987

[54] PROCESS OF AND DEVICE FOR HEATING PARTS OF A DOUBLE BAND PRESS

[76] Inventor: Kurt Held, Alte Strasse 1, D-7218 Trossingen 2, Fed. Rep. of Germany

[21] Appl. No.: 808,870

[22] Filed: Dec. 13, 1985

[30] Foreign Application Priority Data

Dec. 14, 1984 [DE] Fed. Rep. of Germany ....... 3445634

[51] Int. Cl.[4] ........................ B30B 5/06; B30B 15/34; B32B 31/20

[52] U.S. Cl. .................................... 156/64; 100/93 P; 100/93 RP; 100/154; 156/62.2; 156/324; 156/359; 156/378; 156/555; 156/583.5; 165/97; 264/40.6; 425/144; 425/371

[58] Field of Search ...................... 156/359, 555, 583.1, 156/583.5, 64, 324, 62.2, 378; 100/93 P, 93 RP, 154; 425/144, 371; 165/97, 170; 264/40.6

[56] References Cited

U.S. PATENT DOCUMENTS

| | | | |
|---|---|---|---|
| 1,951,999 | 3/1934 | Sprague | 100/215 |
| 3,390,719 | 7/1968 | McCallister | 165/97 |
| 3,461,953 | 8/1969 | Costello et al. | 165/97 |
| 3,568,595 | 3/1971 | Bunting et al. | 100/93 P |
| 3,583,467 | 6/1971 | Bennet | 425/144 |
| 4,336,096 | 6/1982 | Dedekind | 156/583.5 |
| 4,508,670 | 4/1985 | Janke | 264/40.6 |

FOREIGN PATENT DOCUMENTS

| | | |
|---|---|---|
| 512002 | 11/1930 | Fed. Rep. of Germany . |
| 854747 | 11/1952 | Fed. Rep. of Germany . |
| 2421296 | 11/1975 | Fed. Rep. of Germany . |

*Primary Examiner*—Michael Wityshyn
*Attorney, Agent, or Firm*—Toren, McGeady & Associates

[57] ABSTRACT

A process of heating parts of a double band press used in pressing a material moving through the press involves heating a heat transfer medium and flowing it through the press parts in a first direction and, at specific time intervals, reversing the direction of flow so that it passes in the opposite direction. By periodically reversing the direction of flow, differential thermal expansion is avoided within the press parts. In a device for carrying out the proces, a supply line and a return line are connected to a device for heating the return heat transfer medium. A reversing valve is connected to the supply and return line so that the direction of flow of the heat transfer medium through the press parts can be reversed for providing a balanced heating effect.

2 Claims, 4 Drawing Figures

PROCESS OF AND DEVICE FOR HEATING PARTS OF A DOUBLE BAND PRESS

BACKGROUND OF THE INVENTION

The present invention is directed to a process of heating parts in a double band press for transferring heat to the material being processed in the press. In addition, the invention is directed to a device for carrying out the process including a heating device which heats the heat transfer medium and is connected over a supply line and a return line to opposite ends of medium flow passageways through the press parts.

It is known from German Offenlegungsschrift No. 24 21 296 to utilize double band presses for fabricating continuous, sheet-like materials, in particular for the production of decorative laminates, chipboards, fiberboards, electrolaminates or the like. Such presses include two press bands each stretched over a pair of reversing drums with the material being processed passing between the press bands where pressure and heat are applied so that the material is hardened. The heat required in the pressing operation is passed from the reversing drum located at the press inlet and the drum is heated by a heat transfer medium with the heat passing into the material being processed. In addition to the reversing drums, additional parts of the double band presses are heated by the heat transfer medium so that the entire press stand is maintained at a uniform temperature. It has been found that local temperature differences in the press stand can result in differential thermal expansion and such expansion can have a deleterious effect on the final dimensions of the finished product being processed in the press. It is also necessary to assure that there are no temperature differences in the heated reversing drums, since such a situation would result in temperature differences being transmitted through the press bands to the pressed product.

SUMMARY OF THE INVENTION

The primary object of the present invention is to provide a process for heating the parts of the double band press so that no local temperature differences occur which would impair the quality of the pressed product.

With regard to the present invention, it was noted that the heat transfer medium cools off during its flow through the parts of the press being heated and, as a result, there is a diminishing amount of heat transmitted to the press parts in the direction of flow. In accordance with the present invention, the direction of flow of the heat transfer medium is periodically reversed at specific time intervals.

In apparatus for carrying out the process of the present invention, a reversing valve is provided between the source of the heated transfer medium and the flow paths through the press parts so that the direction of flow can be reversed as required.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
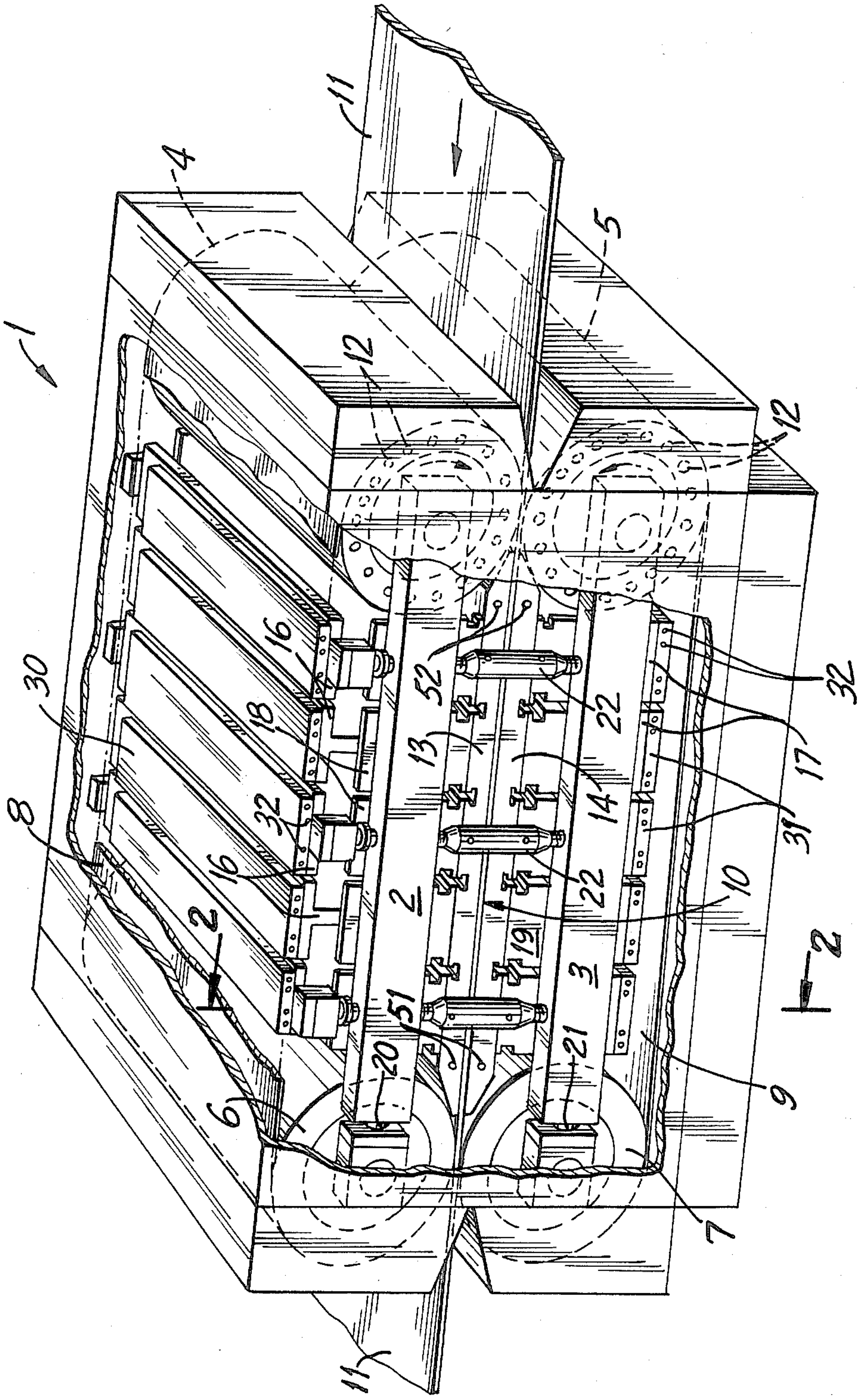
FIG. 1 is a perspective view schematically illustrating a double band press embodying the present invention.

In FIG. 1 a press stand for a double band press 1 is shown including four reversing drums 4, 5, 6, 7 rotatably supported in elongated bearing supports 2, 3. Drums 4 and 6 are upper drums while drums 5 and 7 are lower drums. An upper press band 8 extends around the two upper drums 4, 6 and a lower press band 9 extends around the lower drums 5, 7. Usually the press bands are formed of a high tensile steel. Though not illustrated, one upper reversing drum and one lower reversing drum is driven. The direction of drum rotation is indicated by arrows on the ends of the reversing drum 4, 5. A material sheet 11 is shown passing through the so-called reaction zone 10 between the upper and lower press bands 8, 9. As indicated by the arrow on the material sheet 11, it moves in the direction from the right-hand side to the left-hand side of the press as illustrated in FIG. 1. The material shown can be formed as a laminate impregnated with synthetic resin, fiber binder mixtures or the like and, as it moves through the reaction zone 10, it is compressed under the application of heat and pressure.

The reversing drums 4, 5 located at the inlet side of the double press band have channels 12 extending therethrough parallel to the drum axis. A heated heat transfer medium, such as a thermal oil, is directed through the channels 12 in a known manner. By heating the heat transfer medium to a specific high temperature and directing it through the channels 12, the surface of the reversing drums 4, 5 over which the press bands 8, 9 are trained, is heated. The heat is transferred by conduction from the drum to the press bands and then is given up to the material sheet, for example, to cure the resin in the sheet.

Pressure is exerted on the material sheet 11 in the reaction zone 10 by pressure plates 13, 14 pressed hydraulically or mechanically against the inner sides of the press bands 8, 9, that is, the pressure plates 13, 14 act against the opposite sides of the press bands from the sides contacting the sheet material 11 in the reaction zone 10. The reaction forces developed in this procedure are transferred from the pressure plates 13, 14 into the machine stand of the double band press 1. For this purpose twin-T-profiled support carriers 16, 17 are secured to one another on the opposite sides of the pressure plates 13, 14 from the press bands in the reaction zone. The support carriers extend transversely of the direction of movement of the material strip 11 through the reaction zone and extend transversely across the entire width of the press 1. End plates 18 are welded to the opposite end faces of the support carriers 16, 17 and the support carriers are secured to the bearing supports 2, 3.

Figure 2:
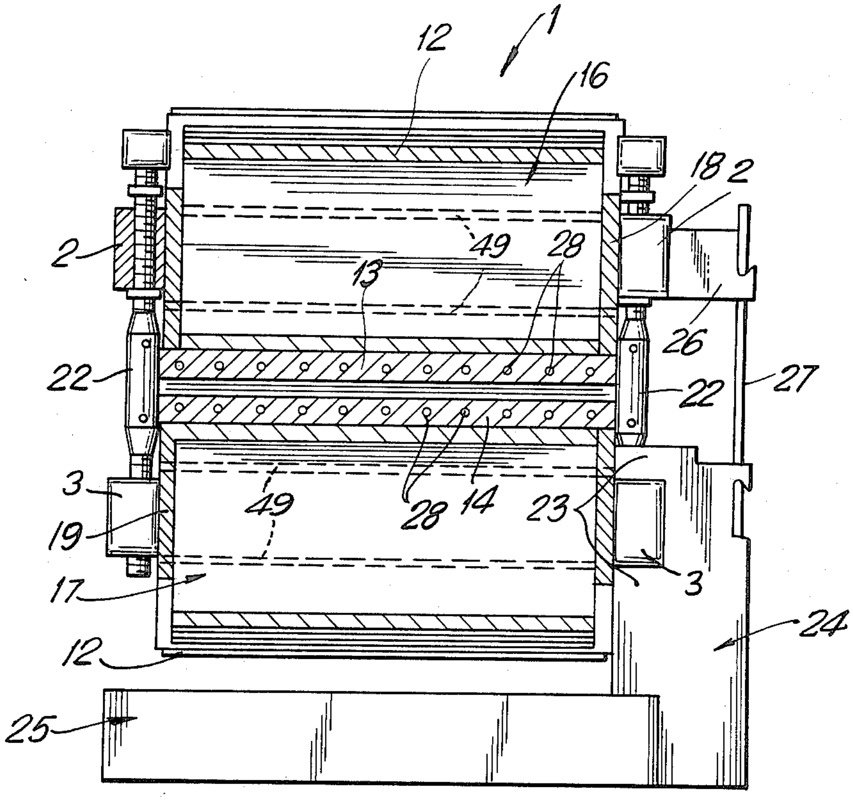
FIG. 2 is a sectional view taken along the line 2—2 in FIG. 1.

The upper and lower bearing supports 2, 3 each contain hydraulic cylinders 20, 21 so that the press bands can be tensioned over the reversing drums. The pair of upper bearing supports 2 is supported by threaded spindles 22 on the lower pair of bearing supports 3. The threaded spindles 22 are used to adjust the reaction zone between the upper and lower bands 8, 9. As shown in FIG. 2, the lower bearing supports are carried in a cantilevered manner at the rear side of the double band press 1 between the legs 23 of two L-shaped posts 24. Posts 24 are secured to a stationary heavy base plate 25. Arms 26 extend outwardly from the upper support 2 located on the right-hand side of FIG. 2 and are supported from the posts 24 by a tension rod 27 so that a stable cantilevered arrangement results which permits changing of the press band from the front side of the press 1, that is, the left-hand side in FIG. 2 or the front side as viewed in FIG. 1.

Figure 3:
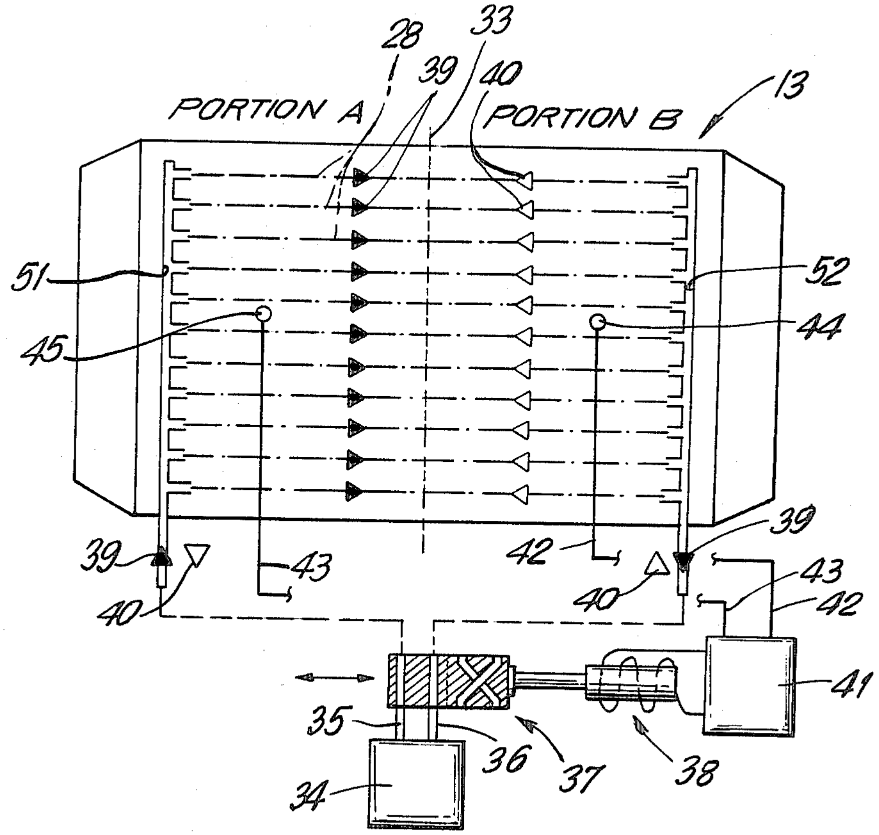
FIG. 3 is a diagrammatic illustration displaying the reversal of direction of the heat transfer medium flowing through a press part.

To avoid temperature differences and thus local differential thermal expansion in the press stand to maintain its dimensional accuracy, the sheet material being processed along with the reversing drums and additional parts of the double band press 1 are heated. In particular, the pressure plates 13, 14 are among the press parts which are heated. In the pressure plates 13, 14 elongated bores 28, note FIG. 3, are provided extending in generally parallel relation so that the heat transfer medium can flow through the plates. The supply and removal of the heat transfer medium is effected by collecting lines 51, 52 extending transversely of the bores 28. The collecting lines are located on the opposite sides of the pressure plates 13, 14.

As indicated in FIG. 2, the twin-T-profiled support carriers 16, 17 are provided with bores 49 through which the heat transfer medium is passed.

On the flanges or heads of the support carriers 16, 17 directed away from the reaction zone 10, heatable compensation flanges 30, 31 are welded on. Bores 32 are formed through these flanges so that the heat transfer medium can be passed through them.

In the various press parts which are to be heated, the heat transfer medium flows continuously and after exiting from the parts is reheated in a heating device, such as an oil burner, and then returns through flow lines to the parts to be heated. During the continuous circulation of the heat transfer medium flowing through the bores 12 of the reversing drums 4, 5 or through the bores 32 in the compensating flanges 30, 31, heat is continuously transferred to the press parts and the medium is continuously being cooled. Since the amount of heat given up is proportional to the temperature difference between the part being heated and the transfer medium so that the regions of the press parts being heated which are located downstream relative to the medium flow are not heated to the same temperature as those parts which are closer to the inlet end of the heat transfer medium. Due to this feature, up until the present time an undesirable local differential temperature gradient occurs in the press stand which led to bending of the press parts and resulted in a press product of imperfect dimensions.

To avoid local temperature differentials and their disadvantageous consequences within a double band press 1, the present invention proposes the periodic reversal of the direction of flow of the heat transfer medium. This concept is disclosed in FIG. 3 which schematically depicts the pressure plate 13 in plan view. The concept, however, applies in a similar manner to the other heatable press parts of the double band press 1.

In FIG. 3 the pressure plate 13 is divided at its center by an imaginary dotted line 33 dividing it into two symmetrical portions A, B. In the left-hand portion A the collecting line 51 is located at the left edge while in the right-hand portion B the collecting line 52 is located at the right edge. As shown schematically in FIG. 3, lines or bores 28 extend through the pressure plate 13 interconnecting the collecting lines 51, 52.

The collecting lines 51, 52 form a part of the circulation of the heat transfer medium flowing through the pressure plate 13 for heating the plate. The heat transfer medium is heated within a burner 34 and has a supply line 35 for directing the medium to the plate 13 and a return line 36 for returning the medium to the burner for reheating. Lines 35, 36 are connected to a commercially available reversing valve 37 remotely controlled by a schematically indicated electromagnet 38. In the position of the reversing valve 37 shown in FIG. 3, the supply line 35 from the burner 34 is connected to the collecting line 51 and the return line 36 is connected with the collecting line 52. Accordingly, the heat transfer medium flows through the collecting line 51 supplying the medium into the pressure plate 13 and after its flow through the pressure plate the medium flows into collecting line 52 and then returns to the burner through the return line 36. Accordingly, the flow of the heat transfer medium passes through the collecting line 51 and the bores 28 initially through the portion A of the plate 13 and then through the portion B until the medium flows into the collecting line 52 and returns into the burner through the return line 36. The flow from the connecting line 51 to the connecting line 52 is shown by the solid black arrowheads in FIG. 3. Since the heat transfer medium is cooled as it flows through the bores 28 in the pressure plate 13, the amount of heat released is proportional to the temperature difference between the pressure plate and the heat transfer medium with the portion A of the pressure plate 13 receiving a higher temperature than the portion B. This temperature transfer sequence is schematically displayed in FIG. 4 for the position of the reversing valve shown in FIG. 3. At the left edge of portion A there is an inlet temperature T2 and at the right edge of the portion B there is a a outlet temperature T1 with T2 being larger than T1.

If in a further stage of the process the flow direction of the heat transfer medium is reversed by a changeover of the reversing valve as distinguished from that shown in FIG. 3, the heat transfer medium supplied from the burner flows through the supply line 35 to the collecting line 52. Next, the heat transfer medium flows through the bores 28 in the pressure plate and exits into the collecting line 51 and returns through the line 36 into the burner 34. In this stage the heat transfer medium flows through the pressure plate 13 in the opposite direction to that indicated by the solid black arrowheads 39 and instead flows in the direction of the hollow arrowheads 40. Accordingly, the portion B of the pressure plate receives the heat transfer medium at a higher temperature than the portion A. In this reverse direction of flow the heat gradient flowing in the direction from portion B to portion A is also set forth in FIG. 4. In this second stage the right-hand part of portion B has a higher temperature T2 and the left-hand portion A has the lower temperature T1.

Figure 4:
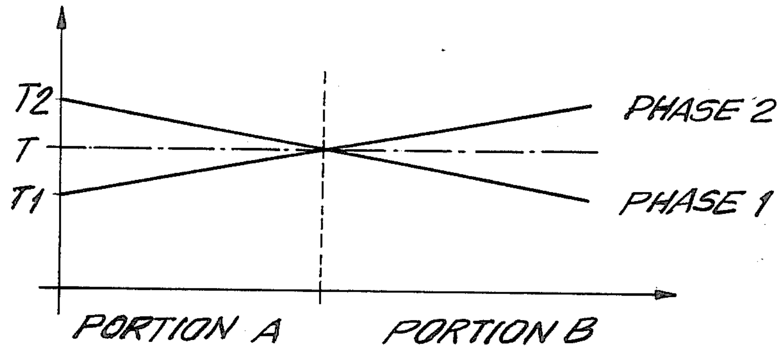
FIG. 4 is a graphical representation of the temperature changes effected in a press part being heated in accordance with the present invention.

Since in the first stage of the heating process a heat gradient is generated from portion A to portion B and in a second stage the heat gradient reverses and flows from portion B to portion A and because both stages follow one another in a time sequence, the heat gradients compensate one another and an average temperature T, as shown in dash-dotted lines in FIG. 4, is achieved in both portions A and B of the pressure plate 13. The changeover between the two stages takes place continuously for assuring the proper temperature balance is achieved.

If the stage changes or the reversal in direction of flow of the heat transfer medium takes place periodically in appropriately selected time intervals, then, after a certain start-up period, a constant temperature T is established across the entire pressure plate 13 and there are no local temperature differentials and, as a result, no change in shape due to differential thermal expansion. In one embodiment of the invention, the time intervals from the start of one stage to the commencement of the next stage is selected to be equal. Therefore, the process is carried out with a constant period duration for the flow reversal procedure. In another embodiment of the invention, however, the flow reversal of the heat transfer medium is controlled by a control circuit forming a control cycle or closed loop whereby a constant desired temperature is set for the press part to be heated and the instantaneous temperature is measured at various points on the press part, so that, depending on the magnitude of the deviation between the desired temperature and the instantaneous temperatures, the time intervals are changed by the control cycle until the desired temperature is established.

In FIG. 3 a control cycle or closed control loop 41 is shown schematically and, on one hand, actuates the reversing valve 37 by means of the electromagnet 38, and, on the other hand, is connected to the lines 42, 43 with temperature sensors 44, 45 with the sensors being arranged in the portion B or portion A of the pressure plate.

The procedure for changing the direction of flow of the heat transfer medium with respect to the pressure plate 13, can also be used in the remaining press parts to be heated in the double band press, particularly in the reversing drums 4, 5, the support carriers 16, 17, and the compensation flanges 30, 31. Changes in the dimensions of the press stand due to differences in temperature are avoided by maintaining a uniform constant temperature for the press parts whereby the material sheet 11 being pressed exits from the output side of the double band press in a very accurately dimensioned condition.

A particular advantage of the present invention is that it can be utilized without any appreciable additional fabrication and can be employed on presently existing double band presses.

While specific embodiments of the invention have been shown and described in detail to illustrate the application of the inventive principles, it will be understood that the invention may be embodied otherwise without departing from such principles.

I claim:

1. A process of heating the parts of a double band press by circulating a heated heat transfer medium through said parts, comprising the steps of arranging rectilinear parallel flow paths for the heat transfer medium through said parts with said flow paths having a first end and an opposite second end, flowing the heat transfer medium along the rectilinear flow paths through said parts from the first end to the second end, periodically reversing the flow of the heat transfer medium from the second end to the first end of said flow paths, wherein the improvement comprises the steps of regulating the time interval between reversing the flow by checking the temperature in the parts at spaced locations in the rectilinear direction of the flow paths and maintaining a uniform temperature in said parts by reversing the flow in response to said spaced locations reaching a predetermined temperature differential.

2. In a double band press including parts having bores extending therethrough, an apparatus for heating a heat transfer medium, said apparatus comprising a heating device, means for conveying the heat transfer medium from the heating device to a said part to be heated and for returning the heat transfer medium after its flow through the bores in the part to said heating device, said part having a first end and a second end with the bores extending therebetween in rectilinear parallel relation for effecting the flow of heat transfer medium through said press part, said heating device including a supply line and a return line, wherein the improvement comprises a reversing valve connected to said supply line and said return line and through said means to said first and second ends of said part for alternately supplying the supply and return lines to said first and second ends for selectively directing the flow of the heated heat transfer medium in the first end-second end direction and then in the second end-first direction for effecting balanced heating of the part, a control loop for operating and controlling said reversing valve, said control loop includes temperature sensors positioned at locations on said part spaced apart in the first end-second end direction for determining the instantaneous temperature at said locations and, based on said spaced locations reaching predetermined temperature differential, selectively operating said reversing valve for reversing the direction of flow between the first and second ends of said part for balancing the temperature within said part.

* * * * *